(12) United States Patent
Kim

(10) Patent No.: US 11,588,166 B2
(45) Date of Patent: Feb. 21, 2023

(54) METHOD OF COMPENSATING ERROR OF HYDROGEN PRESSURE SENSOR FOR VEHICLE FUEL CELL SYSTEM, AND FUEL CELL SYSTEM USING SAME

(71) Applicants: Hyundai Motor Company, Seoul (KR); Kia Motors Corporation, Seoul (KR)

(72) Inventor: Jae Hoon Kim, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 950 days.

(21) Appl. No.: 16/397,819

(22) Filed: Apr. 29, 2019

(65) Prior Publication Data

US 2020/0153012 A1    May 14, 2020

(30) Foreign Application Priority Data

Nov. 12, 2018 (KR) .................... 10-2018-0137845

(51) Int. Cl.
*H01M 8/04992* (2016.01)
*H01M 8/04082* (2016.01)
(Continued)

(52) U.S. Cl.
CPC ......... *H01M 8/04992* (2013.01); *B60L 58/30* (2019.02); *H01M 8/04089* (2013.01); *H01M 8/04201* (2013.01); *H01M 8/04231* (2013.01); *H01M 8/04388* (2013.01); *H01M 8/04753* (2013.01); *B60L 50/72* (2019.02); *H01M 2250/20* (2013.01)

(58) Field of Classification Search
CPC ......... H01M 8/04992; H01M 8/04089; H01M 8/04201; H01M 8/04231; H01M 8/04388; H01M 8/04753
See application file for complete search history.

(56) References Cited

U.S. PATENT DOCUMENTS 9,614,235 B2 * 4/2017 Kanie .............. H01M 8/04089
2016/0172696 A1 * 6/2016 Milacic ............ H01M 8/04992
429/431

(Continued)

*Primary Examiner* — Amanda C. Walke
(74) *Attorney, Agent, or Firm* — Morgan, Lewis & Bockius LLP

(57) ABSTRACT

A method of correcting error of hydrogen pressure sensor of vehicle fuel cell system, may checking, whether an opening ratio of a hydrogen pressure regulation valve is in a normal range by use of data map; checking whether a hydrogen purge valve is opened when the opening ratio of the hydrogen pressure valve is not within the normal range; changing the opening ratio of the hydrogen pressure regulation valve at least one time when the hydrogen purge valve is determined as being opened, and detecting two or more measurement values of the hydrogen pressure sensor at two or more different opening ratios of the hydrogen pressure regulation valve; and comparing, the two or more measurement values of the hydrogen pressure sensor detected at the two more opening ratios, respectively with predetermined pressure values corresponding to the opening ratios, and correcting errors between the measurement values and the predetermined pressure values.

14 Claims, 5 Drawing Sheets

(51) Int. Cl.
*H01M 8/04089* (2016.01)
*H01M 8/0438* (2016.01)
*H01M 8/04746* (2016.01)
*B60L 58/30* (2019.01)
*H01M 8/04223* (2016.01)
*B60L 50/72* (2019.01)

(56) References Cited

U.S. PATENT DOCUMENTS

2016/0308228 A1* 10/2016 Takahashi ......... H01M 8/04395
2016/0322657 A1* 11/2016 Fukatsu ............ H01M 8/04559
2017/0237090 A1* 8/2017 Kim .................. H01M 8/04302
   429/410

* cited by examiner

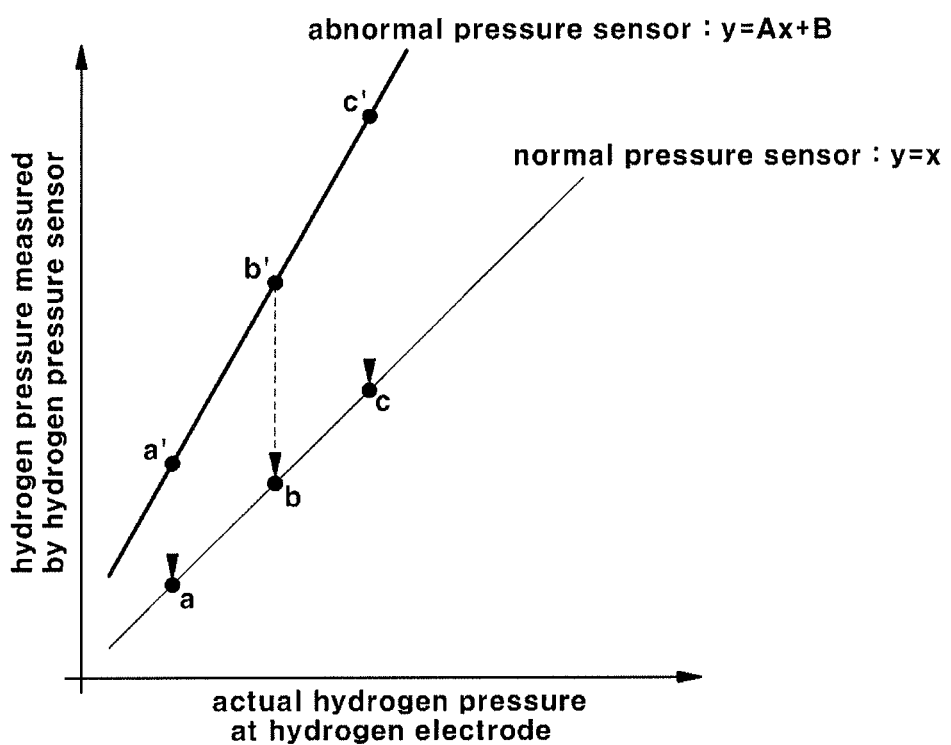

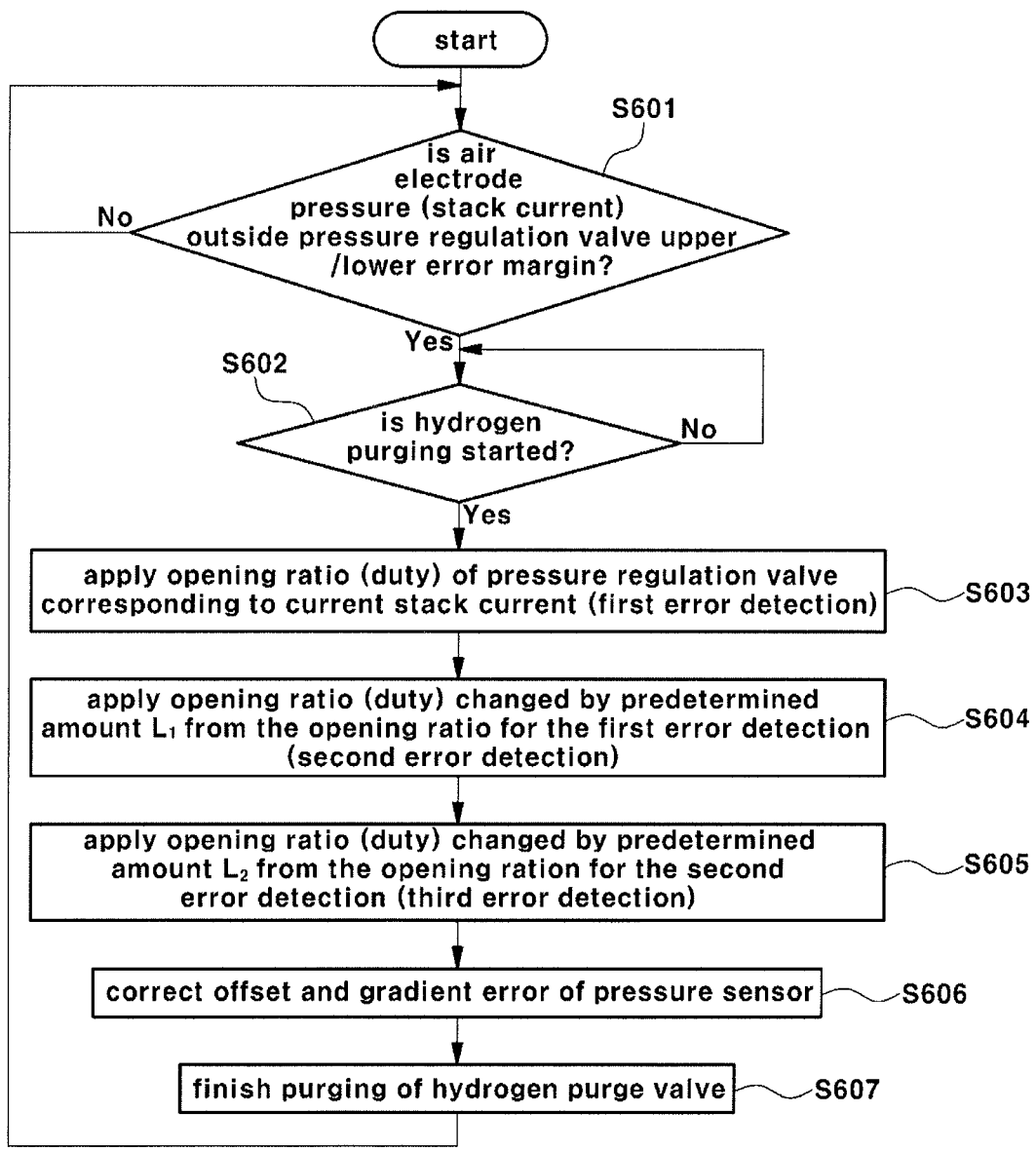

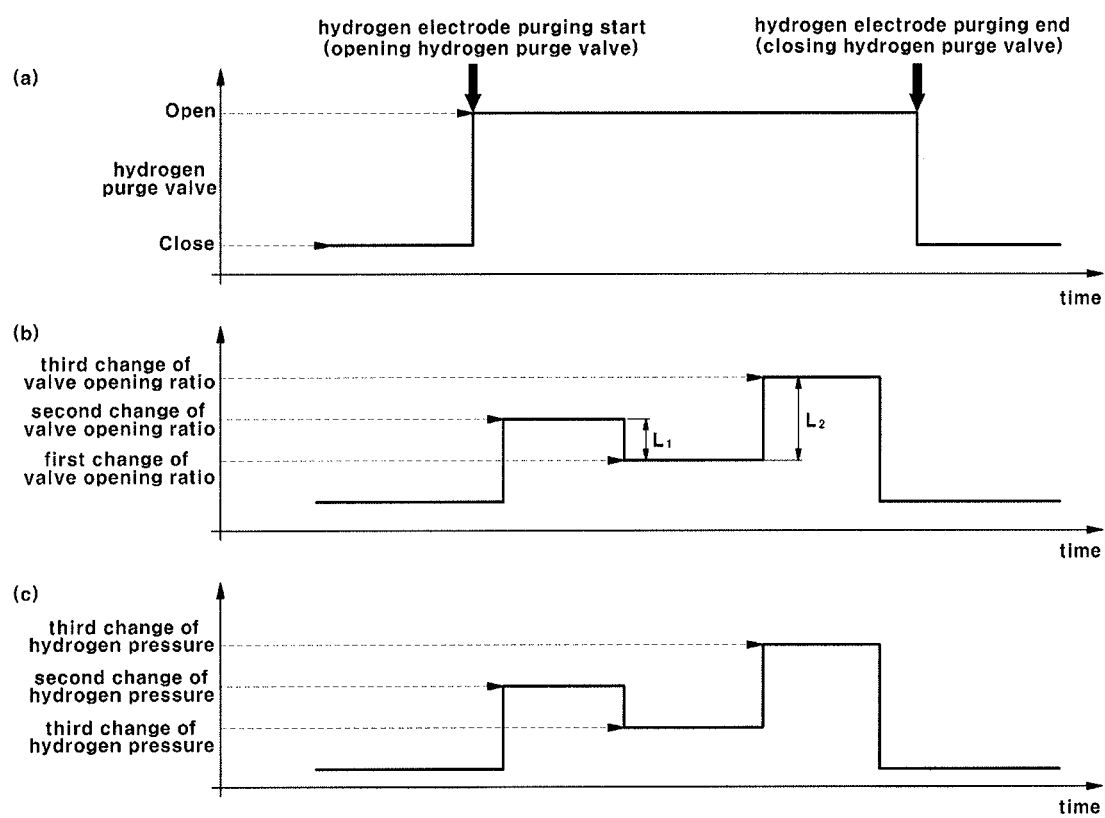

METHOD OF COMPENSATING ERROR OF HYDROGEN PRESSURE SENSOR FOR VEHICLE FUEL CELL SYSTEM, AND FUEL CELL SYSTEM USING SAME

CROSS REFERENCE TO RELATED APPLICATION

The present application claims priority to Korean Patent Application No. 10-2018-0137845, filed Nov. 12, 2018, the entire contents of which is incorporated herein for all purposes by this reference.

BACKGROUND OF THE INVENTION

Field of the Invention

The present invention relates to a method of compensating an error of a hydrogen pressure sensor in a vehicle fuel cell system and a fuel cell system using the method. More specifically, the present invention relates to a method of compensating an error of a hydrogen pressure sensor in a vehicle fuel cell system, occurring specifically while driving of a vehicle, and a fuel cell system that performs error compensation for a fuel cell system by use of the method.

Description of Related Art

Among the main components of a fuel cell system, a fuel cell stack is a type of power generation device that causes chemical reaction between oxygen in the air and hydrogen supplied from the outside thereof to generate electrical energy.

These fuel cell systems may be divided into an industrial use type and a household use type and may be used as a power source to supply electric power to vehicles.

A fuel cell system applied to a fuel cell vehicle may include a fuel cell stack that generates electrical energy through electrochemical reactions of reactive gases that are hydrogen serving as fuel and oxygen serving as an oxidant, a hydrogen feeding unit that feeds hydrogen serving as fuel to the fuel cell stack, an air feeding unit that feeds air containing oxygen to the fuel cell stack, a heat and water management systems that control the operating temperature of the fuel cell stack and perform water management, and a fuel cell controller that controls the overall operation of the fuel cell system.

In a conventional fuel cell system, a hydrogen feeding unit may include a hydrogen reservoir (hydrogen tank), a regulator, a hydrogen pressure regulation valve, a hydro circulation system, etc. The air feeding unit may include an air blower, a humidifier, etc. The heat and water management system may include a cooling water pump, a water tank, a radiator, etc.

In the stack of a fuel cell system, water is generated as a byproduct of the reaction of hydrogen and oxygen. When the generated water accumulates in the stack, the fuel cell system suffers from performance degradation due to the residual water in the stack. For controlling the performance degradation of a fuel cell stack, the fuel cell system is provided with a condensate reservoir and a drain valve for condensate removal.

Furthermore, in the stack, nitrogen crossover to a fuel electrode through an electrolytic membrane from an air electrode occurs, which leads to a decrease in the concentration of hydrogen in the fuel electrode. Therefore, to maintain the concentration of hydrogen in the fuel electrode, an exhaust valve called purge valve is disposed on a fuel return line of a fuel circulation line, and gas at the fuel electrode side is periodically exhausted through the exhaust value. In the present way, the concentration of hydrogen on the fuel electrode side is maintained.

On the other hand, hydrogen fuel supplied to a fuel cell vehicle to be supplied to the stack needs to be controlled according to a stack current. The fuel amount (i.e., hydrogen) supplied to the fuel cell stack is controlled by a hydrogen pressure regulator valve. When it is necessary to increase the stack current, the hydrogen supply pressure is increased so that the amount of hydrogen on the reaction surface in the stack may be increased.

That is, hydrogen supply needs to be precisely controlled such that the stack current and the pressure are balanced. When hydrogen is supplied at a pressure higher than the required hydrogen pressure, energy efficiency will decrease and fuel efficiency will deteriorate. On the other hand, a lower hydrogen pressure leads to a dramatic durability deterioration in a short time period, causing serious damage to the stack.

For these reasons, accurate control of hydrogen supply flow in vehicle fuel cell systems is critical to the durability and performance of the stack. To the present end, a hydrogen pressure sensor in a fuel cell system needs to constantly output accurate measurements.

However, the error of a hydrogen pressure sensor inevitably occurs during the operation of a fuel cell system. Therefore, technology that can effectively compensate for the present error and improve the measurement accuracy of a hydrogen pressure sensor is required.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a technology that can compensate for the error of hydrogen pressure sensors during the operation of a fuel cell system to improve the measurement accuracy of a hydrogen pressure sensor.

To accomplish the objective of the present invention, various aspects of the present invention are directed to providing a method of correcting an error of a hydrogen pressure sensor of a vehicle fuel cell system, the method including: checking, by a controller, whether an opening ratio of a hydrogen pressure regulation valve is in a normal range by use of a data map showing a relationship between at least one of a stack current, an air electrode pressure, and an air flow rate, and the opening ratio of the hydrogen pressure regulation valve; checking whether a hydrogen purge valve is opened when the opening ratio of the hydrogen pressure valve is not within the normal range; changing the opening ratio of the hydrogen pressure regulation valve at least one time when the hydrogen purge valve is determined as being opened, and detecting two or more measurement values of the hydrogen pressure sensor at two or more different opening ratios of the hydrogen pressure regulation valve, respectively; and comparing, by the controller, the two or more measurement values of the hydrogen pressure sensor detected at the two more opening ratios, respectively with normal pressure values corresponding to the opening ratios, respectively, and correcting errors between the measurement values and the normal pressure values, respectively.

The normal pressure values may be values pre-stored in the controller and varying according to the opening ratios of the hydrogen pressure regulation valve in a normal state when the hydrogen purge valve is opened.

In the detecting of the two or more measurement values of the hydrogen pressure sensor, a first measurement value of the two more measurement values may be detected at an initial opening ratio of the hydrogen pressure regulation valve when the hydrogen pressure regulation valve starts opening, a second measurement value may be detected at a first opening ratio of the hydrogen pressure regulation valve when the opening ratio of the hydrogen pressure regulation valve is changed one time from the initial opening ratio in a case where the opening ratio of the hydrogen pressure regulation valve is designed to be changed a total of two times from the initial opening ratio, and a third measurement value may be detected at a second opening ratio when the opening ratio of the hydrogen pressure regulation valve is changed from the initial opening ratio two times.

In the correcting of the error of the hydrogen pressure sensor, the error of the hydrogen pressure sensor may be corrected such that the first measurement value, the second measurement value, and the third measurement value follow normal measurement values corresponding to the initial opening ratio, the first opening ratio, and the third opening ratio of the hydrogen pressure regulation valve, respectively.

In the correcting of the error of the hydrogen pressure sensor, the error may be corrected such that a pressure offset of the measurement value and a gradient error of the hydrogen pressure sensor are determined, and the pressure offset and the gradient error are eliminated.

The data map may include information related to an upper error margin and a lower error margin with respect to a normal opening ratio of the hydrogen pressure regulation valve, and the controller may be configured to determine that the opening ratio of the hydrogen pressure regulation valve is not within the normal range when the opening ratio of the hydrogen pressure regulation valve is outside the upper error margin or the lower error margin.

The detecting of the measurement value of the hydrogen pressure sensor starts after the hydrogen purge valve opens and ends before the hydrogen purge valve closes.

To accomplish the objective of the present invention, various aspects of the present invention are directed to providing a vehicle fuel cell system including: a hydrogen supply shut-off valve mounted on a hydrogen supply line connected to a hydrogen tank and a fuel cell stack and configured to allow or interrupt supply of a hydrogen gas contained in the hydrogen tank to the fuel cell stack; a hydrogen pressure regulation valve mounted on the hydrogen supply line downstream of the hydrogen supply shut-off valve and configured to reduce a pressure of the hydrogen gas passing through the hydrogen supply shut-off valve and supply the pressure-reduced hydrogen gas to the fuel cell stack; a hydrogen pressure sensor configured to measure the pressure of the hydrogen gas supplied to a hydrogen electrode of the fuel cell stack through the hydrogen supply line; a hydrogen purge valve disposed on an outlet side of the hydrogen electrode and configured to selectively perform hydrogen purging; and a controller connected to the hydrogen pressure sensor, the hydrogen supply shut-off valve and hydrogen purge valve and configured to receive pressure information from the hydrogen pressure sensor and to control operation of the hydrogen supply shut-off valve and the hydrogen purge valve, wherein the controller is configured to store a data map showing a relationship between at least one of a stack current, an air electrode pressure, and an air flow rate, and an opening ratio of the hydrogen pressure regulation valve, and normal pressure values according to opening ratios of the hydrogen pressure regulation valve, and the controller changes the opening ratio of the hydrogen pressure regulation valve at least one time when it is determined that the opening of the hydrogen pressure regulation valve is not within a normal range on the basis of the data map when the hydrogen purge valve is opened, obtains two or more measurement values detected by the hydrogen pressure sensor at two or more opening ratios of the hydrogen pressure regulation valve, respectively, compares the two or more detected measurement values with normal pressures detected by a normal hydrogen pressure sensor at the opening ratios at which the measurement values are detected, respectively, and corrects an error of the hydrogen pressure sensor in real time.

The normal pressure values are values pre-stored in the controller and vary according to the opening ratios of the hydrogen pressure regulation valve in a normal state when the hydrogen purge valve is opened.

The controller obtains a first measurement value detected by the hydrogen pressure sensor at an initial opening ratio of the hydrogen pressure regulation valve at initial timing at which the hydrogen pressure regulation valve starts opening, a second measurement value detected by the hydrogen pressure sensor at a first opening ratio of the hydrogen pressure regulation valve when the opening ratio of the hydrogen pressure regulation valve is changed one time in a case where the opening ratio is designed to be changed a total of two times from the initial opening ratio, and a third measurement value detected by the hydrogen pressure sensor at a second opening ratio of the hydrogen pressure regulation valve when the opening ratio of the hydrogen pressure regulation valve is changed two times from the initial opening ratio.

The controller corrects an error of the hydrogen pressure sensor such that the first measurement value, the second measurement value, and the third measurement value follow the normal measurement values corresponding to the opening ratios at which the first measurement value, the second measurement value, and the third measurement value are detected, respectively.

The controller is configured to determine a pressure offset of the measurement value and a gradient error of the hydrogen pressure sensor, and performs error correction such that the pressure offset and the gradient error are eliminated.

The data map may include information related to an upper error margin and a lower error margin with respect to a normal opening ratio of the hydrogen pressure regulation valve, and the controller is configured to determine whether the opening ratio of the hydrogen pressure regulation valve is in a normal range or not when the opening ratio of the hydrogen pressure regulation valve is outside the upper error margin or the lower error margin.

The controller starts changing the opening ratio of the hydrogen pressure regulation valve and finishes obtaining the first, second, and third the measurement values detected by the hydrogen pressure sensor at the opening ratios of the hydrogen pressure regulation valve.

According to an exemplary embodiment of the present invention, the error of the pressure sensor on the hydrogen electrode side may be compensated at any time, even during the operation of the fuel cell system. Therefore, it is possible to manage the fuel cell system while maintaining the optimal hydrogen supply during operation of the fuel cell system.

Furthermore, it is possible to compensate for a tilt angle of the hydrogen pressure sensor by compensating for errors at multiple positions of different valve openings as well as it is possible to compensate for the offset error of the pressure sensor. Therefore, accurate sensor error compensation is possible.

Furthermore, according to an exemplary embodiment of the present invention, since the hydrogen pressure sensor error correction is performed in real time during the operation of a fuel cell system, it is possible to minimize a hydrogen purging volume and hydrogen loss attributable to a hydrogen crossover volume, maximizing fuel efficiency and fuel cell system efficiency.

Furthermore, since the error of the hydrogen pressure sensor may be corrected during the operation of the fuel cell system, it is possible to improve the durability of an electrolytic membrane including a catalyst and maximize the fuel cell stack performance.

Furthermore, according to an exemplary embodiment of the present invention, air is not introduced into the air electrode during correction of the error of the hydrogen pressure sensor. Therefore, a reverse voltage which may occur when air is introduced into the hydrogen electrode does not occur, improving the durability of the electrolytic membrane.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a diagram illustrating an operation in which error correction is conducted at three consecutive points in a vehicle fuel cell system, in accordance with a method of compensating for an error of a hydrogen pressure sensor according to an exemplary embodiment of the present invention;

FIG. 6 is a flowchart illustrating the hydrogen pressure sensor error correction method, according to the exemplary embodiment of the present invention, which is performed in a vehicle fuel cell system; and FIG. 7 is a graph illustrating (a) timing of opening and closing of a hydrogen purge valve opening and closing, (b) changes in valve opening ratio, and (c) changes in hydrogen pressure at the same valve opening ratio as in the flowchart of FIG. 6.

Figure 1:
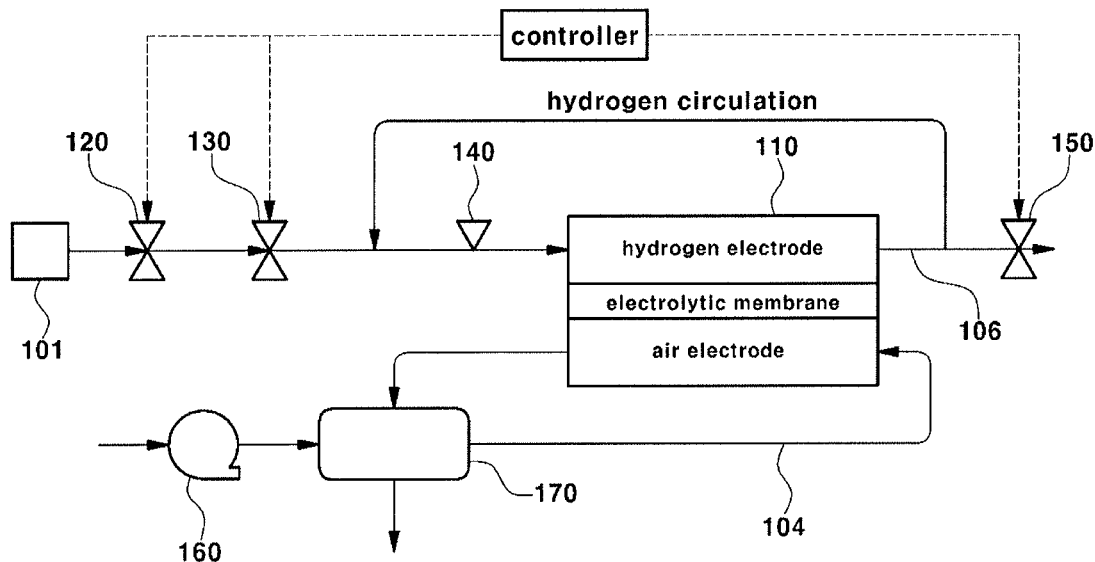
FIG. 1 is a fuel cell system to which a hydrogen pressure sensor error correction method according to an exemplary embodiment of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a hydrogen pressure sensor error correction method performed in a vehicle fuel cell system, according to an exemplary embodiment of the present invention, will be described with reference to the accompanying drawings.

FIG. 1 is a diagram schematically illustrating the overall configuration of a fuel cell system to which a hydrogen pressure sensor error correction method according to an exemplary embodiment of the present invention is applied.

As illustrated in FIG. 1, the fuel cell system includes an air supply line 104 for supplying air to an air electrode in a fuel cell stack 110 and a hydrogen supply line 106 for supplying hydrogen to a hydrogen electrode in the fuel cell stack 110. The air supply line 104 is provided with an air compressor 160 to supply air and a humidifier 170 to humidify the air to be supplied to the fuel cell stack 110.

Additionally, the fuel cell system includes a hydrogen supply shut-off valve 120, hydrogen pressure regulation valve 130, a hydrogen pressure sensor 140, and a hydrogen purge valve 150 disposed on the hydrogen supply line extending to the hydrogen electrode, as illustrated in FIG. 1. Furthermore, the fuel cell system includes a controller that receives hydrogen pressure information from the hydrogen pressure sensor 140 and controls the opening and closing of each of the hydrogen supply shut-off valve and hydrogen purge valve disposed on the hydrogen supply line.

The hydrogen supply shut-off valve 120 is a valve for allowing or interrupting the supply of a hydrogen gas pre-stored in a hydrogen tank 101 to the fuel cell stack 110. The hydrogen pressure regulation valve 130 is configured to adjust the pressure (for example, a low pressure of 50 bar or lower) of the hydrogen gas discharged from the hydrogen tank to suit the operation of the fuel cell system and to supply the pressure-adjusted hydrogen gas to the fuel cell system. The hydrogen pressure sensor 140 measures the pressure of the hydrogen gas supplied to the hydrogen electrode. Referring to FIG. 1, one hydrogen pressure sensor 140 is used. Alternatively, multiple hydrogen pressure sensors 140 may be used.

The valve opening ratio of the hydrogen pressure regulation valve 130 is controlled according to the hydrogen pressure measured by the hydrogen pressure sensor 140. Typically, the opening ratio of the hydrogen pressure regulation valve 130 is controlled such that the controller controls the duty of the current applied to the hydrogen pressure regulation valve 130.

The hydrogen purge valve 150 is disposed at the outlet side of the hydrogen electrode, and the hydrogen purge valve 150 remains opened for a certain time period when a preset purge condition is met.

On the other hand, in such a fuel cell system, the error correction of the hydrogen pressure sensor is performed by opening the hydrogen electrode so that the pressure of the hydrogen electrode is equalized to the atmospheric pressure and then by correcting a pressure measurement error.

Figure 2:
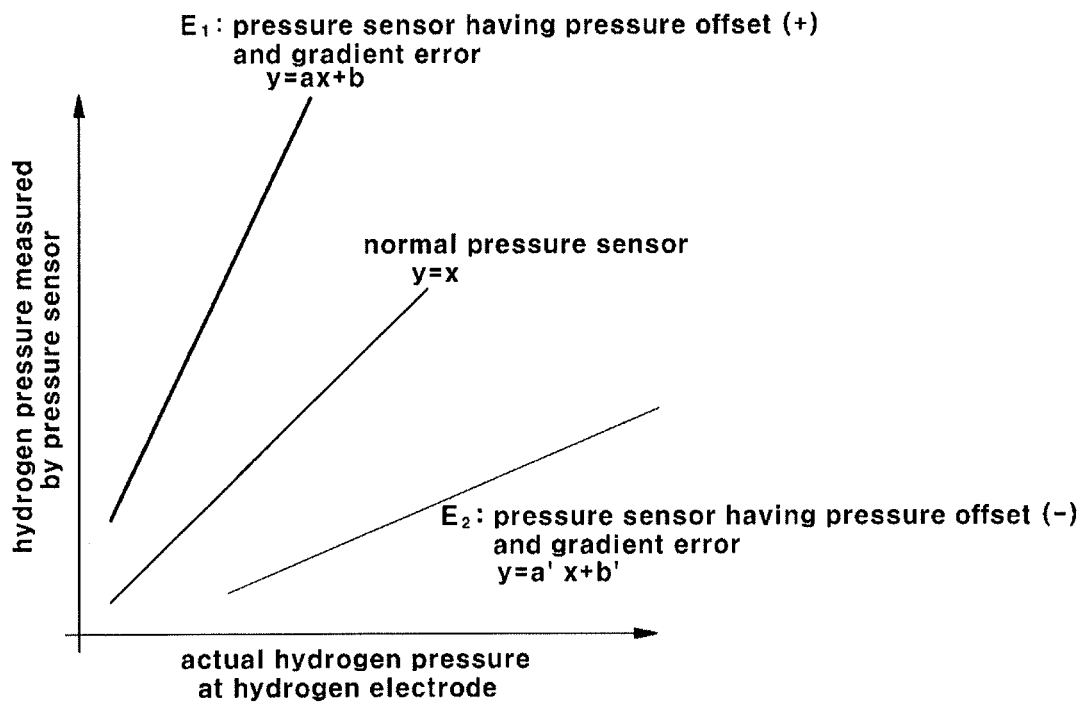
FIG. 2 is a diagram illustrating a normal state and an erroneous state of a hydrogen pressure sensor.
Figure 3:
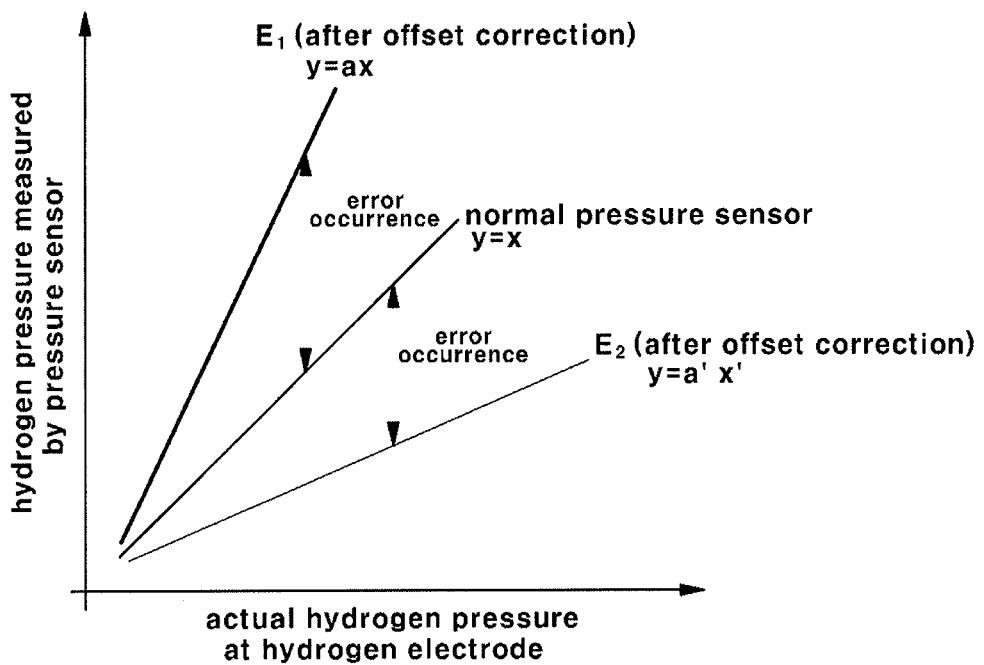
FIG. 3 is a diagram illustrating that an error of a hydrogen pressure sensor occurs due to a gradient error after an offset compensation of the hydrogen pressure sensor is performed.

In this regard, FIG. 2 and FIG. 3 illustrate examples of gradient errors that are likely to occur when the error is corrected through offset compensation of the hydrogen pressure sensor 140 under the atmospheric pressure.

As the reason of errors of the hydrogen pressure sensor 140 shown in FIG. 2 and FIG. 3, a method of setting the measurement value detected by the hydrogen pressure sensor 140 to the atmospheric pressure by exposing the hydrogen electrode to the atmospheric pressure may be considered.

That is, in the method described above, before operation of the fuel cell system is started, the hydrogen electrode is exposed to the air and a pressure offset is refined by setting the pressure of the hydrogen electrode to the atmospheric pressure.

On the other hand, in the case of performing error correction after the operation of the fuel cell system is started, to correct the error, the operation of the fuel cell system is stopped first, and then all the valves disposed on the air electrode side are opened so that the pressure of the air electrode is equalized to the atmospheric pressure. Next, the hydrogen supply valve is shut off to interrupt the supply of hydrogen to the hydrogen electrode. Next, the hydrogen purge or drain valve located at the end portion of the hydrogen electrode is opened such that the pressure of the hydrogen electrode and the atmospheric pressure are equalized.

Next, the pressure offset is changed such that the measurement value detected by the hydrogen sensor 140 becomes the same as the atmospheric pressure. In the present way, the error correction is performed.

In other words, as in the case of a normal pressure sensor illustrated at the center portion of FIG. 2, a relationship "y=x" is established such that the measurement value detected by a normal pressure sensor is equal to the actual pressure at the hydrogen electrode.

An upper line and a lower line respectively above and under the center line representing the operation of the normal hydrogen pressure sensor indicates a case where a pressure offset has a positive value and a gradient error has a positive value (y=ax+b, a>1 and b>0) and a case where the pressure offset has a negative value and the gradient error has a negative value (y=a'x+b', a'<1 and b'<0).

Here, the pressure offset corresponds to the y intercept and means a measurement value detected by a pressure sensor when the actual hydrogen pressure at the hydrogen electrode is 0.

When only the pressure offset is compensated, there still remains the gradient error as illustrated in FIG. 3.

That is, although an error component "b" or "b'" that a pressure offset error is eliminated, an error component "a" or "a'" which is a gradient error still remains. Accordingly, even after the pressure offset compensation is performed, there is still a difference between the actual pressure of the hydrogen electrode and the measurement value detected by the hydrogen sensor 140

As described above, the exemplary embodiment of the present invention features that in a state in which the hydrogen purge valve 150 is open, the hydrogen pressure is detected by the hydrogen pressure sensor 140 at two consecutive valve opening ratios, and the errors of the hydrogen pressure sensor 140, including a pressure offset and a gradient error, are corrected on the basis of the values of the measured hydrogen pressure.

According to the exemplary embodiment of the present invention, it is first checked whether the hydrogen purge valve 150 is open. When it is determined that the hydrogen purge valve 150 is open, the opening ratio of the hydrogen pressure regulation valve 130 is changed at least one time, and the hydrogen pressures (corresponding to the measurement values) are detected by the hydrogen pressure sensor 140 at two or more different opening ratios of the hydrogen pressure regulation valve 130.

Next, the two or more measurement values detected by the hydrogen pressure sensor 140 are compared with normal pressure values that are measured at the valve opening ratios that are used to detect the two or more measurement values by a normal hydrogen pressure sensor in advance and pre-stored in the controller. Next, the errors of the hydrogen pressure sensor 140 is corrected on the basis of the comparison results.

In a case where the opening ratio of the hydrogen pressure regulation valve 130 is changed only one time, the hydrogen pressure at the hydrogen electrode is measured by the hydrogen pressure sensor 140 before the opening ratio of the hydrogen pressure regulation valve 130 is changed and then after the opening ratio of the hydrogen pressure regulation valve 130 is changed.

Since the normal pressure values according to the opening ratios of the hydrogen pressure regulation valve 130 are pre-stored in the controller, the controller can compare the normal pressure values according to the opening ratios of the hydrogen pressure regulation valve 130 before and after the change of the valve opening ratio with the measurement values measured by the hydrogen pressure sensor 140 before and after the valve opening ratio. The errors of the hydrogen pressure sensor 140 are corrected such that the measurement values at different valve opening ratios reach the normal pressure values at the corresponding valve opening ratios, respectively.

In the present control process, the number of times that the valve opening ratio of the hydrogen pressure regulation valve 130 is changed may vary as necessary. When the number of times that the valve opening ratio is changed increases, the error correction accuracy is improved.

Since the errors of the hydrogen pressure sensor 140, including the pressure offset error and the gradient error, linearly change as illustrated in FIG. 2 and FIG. 3, the measurement values of the hydrogen pressure sensor 140 are obtained for three consecutive valve opening ratios at the time of correcting the errors of the hydrogen pressure sensor 140. In the case of performing error correction by obtaining the measurement values at three valve opening ratios, both of the error correction accuracy and the simplified control process may be achieved.

Furthermore, the reason of correcting the errors of the hydrogen pressure sensor in a state in which the hydrogen purge value is open is that the internal condition of the hydrogen electrode affects the error correction of the hydrogen pressure sensor 140 when the opening ratio of the hydrogen pressure regulation valve 130 is changed with the hydrogen electrode being in a closed state (i.e., a closed loop state).

That is, according to an exemplary embodiment of the present invention, in a state in which hydrogen purge valve 150 is open, the pressure at the end portion of the hydrogen electrode and the atmospheric pressure are equalized, and afterwards the opening ratio of the hydrogen pressure regulation valve 130 is adjusted to correct the errors of the hydrogen pressure sensor 140.

The hydrogen pressure sensor error correction method for a vehicle fuel cell is performed only when the opening ratio of the hydrogen pressure regulation valve 130 according to the stack current is in an abnormal condition.

That is, according to the exemplary embodiment of the present invention, when determining whether it is necessary to perform error correction to prevent overly excessive error correction, a data map showing a relationship between the stack current and the opening ratio of the hydrogen pressure regulation valve 130 is used.

Figure 4:
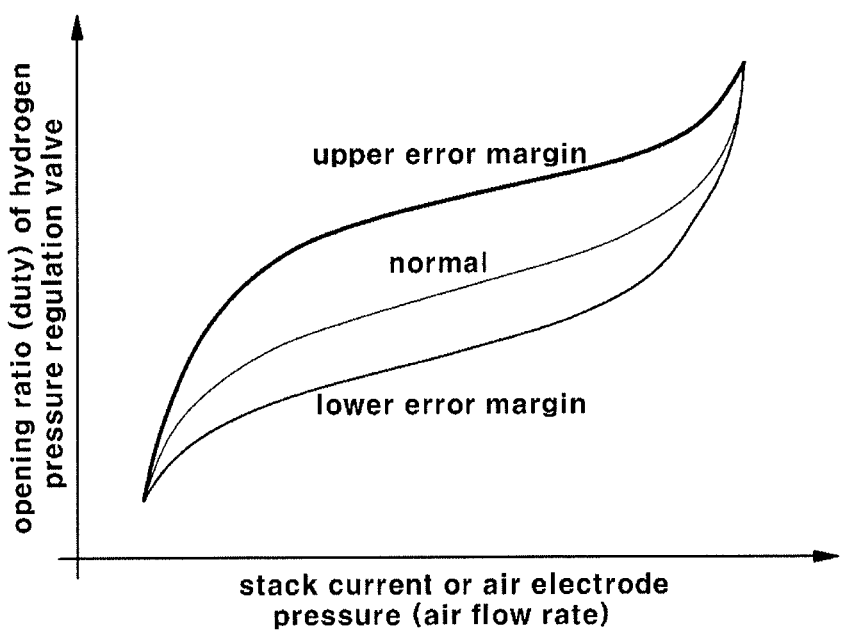
FIG. 4 is a diagram illustrating an operation map showing a normal operation condition according to a relation between a stack current or an air electrode pressure and an opening of a hydrogen pressure regulation valve.

FIG. 4 illustrates a normal operation state determined from an operation map showing the relationship between the stack current or the air electrode pressure and the opening ratio of the hydrogen pressure regulation valve.

The present invention utilizes the data map of "the stack current or the air electrode pressure (air flow rate) vs. the opening ratio of the hydrogen pressure regulation valve 130" as shown in FIG. 4. The data map is used when the hydrogen electrode is exposed to the atmospheric pressure in a state in which a fuel cell current is applied during operation of a fuel cell system.

Referring to FIG. 4, the hydrogen supply pressure at the hydrogen electrode is associated with the stack current, the air flow rate at the air electrode, or the air pressure at the air electrode in a predetermined manner.

That is, when the stack current is determined in a general fuel cell system, the flow rate of air supplied to the stack or the air pressure at the air electrode of the stack are determined according to the stack current. Furthermore, the hydrogen supply pressure at the hydrogen electrode and the opening ratio of the hydrogen pressure regulation valve are determined according to the air flow rate supplied to the stack.

Accordingly, when the stack current is constant, a constant measurement value is measured by the hydrogen pressure sensor 140 and is fed back to the hydrogen pressure regulation valve 130 so that a constant opening ratio of the hydrogen pressure regulation valve 130 may be maintained.

On the other hand, as illustrated in FIG. 4, a normal hydrogen pressure sensor 140 maintains the opening ratio (duty) of the hydrogen pressure regulation valve 130 according to the stack current as indicated by a curve labeled with "normal".

On the other hand, as illustrated in FIG. 4, the data map may be configured to include an upper error margin and a lower error margin with respect to the normal opening ratio of the hydrogen pressure regulation valve 130.

At the same stack current or the same air electrode pressure (air flow rate), the opening ratio of the hydrogen pressure regulation valve 130 needs to be within a range (shaded region in FIG. 4) of from the upper error margin to the lower error margin. When the opening ratio of the hydrogen pressure regulation valve 130 is outside the range of from the upper error margin to the lower error margin for the same stack current or the same air electrode pressure (air flow rate), the errors of the hydrogen pressure sensor 140 occur at the same stack current or the same air electrode pressure (air flow rate), which influences the opening ratio of the hydrogen pressure regulation valve 130.

Therefore, when it is determined that the valve opening ratio exceeds the upper error margin or falls short of the lower error margin on the basis of the data map, the controller is configured to determine that the opening ratio of the hydrogen pressure regulation valve 130 is not in a normal range and performs the error correction for the hydrogen pressure sensor 140.

FIG. 5 illustrates an exemplary embodiment of the present invention in which the error correction for the hydrogen pressure sensor 140 is performed at consecutive three points (i.e., opening ratios) in the hydrogen pressure sensor error correction method for a vehicle fuel cell system.

The reason of measuring the hydrogen pressures at three or more consecutive points (three or more different opening ratios) of the hydrogen pressure regulation valve 130 when performing the error correction for the hydrogen pressure sensor 140 is to reduce all the errors of the hydrogen pressure sensor 140. That is, it is directed to correct the gradient error of the hydrogen pressure sensor 140 as well as correct an offset (zero point) of the hydrogen pressure sensor 140.

In the error correction process, the hydrogen pressure measurement values a', b', and c' are obtained at three points according to different opening ratios of the hydrogen pressure regulation valve 130, and the control is performed such that the hydrogen pressure measurement values a', b', and c' approach normal pressure values a, b, and c of a normal hydrogen pressure sensor, respectively. In a sensor characteristic equation ($y=Ax+B$) of an abnormal pressure sensor, the pressure offset B and the gradient error A are eliminated. Therefore, error correction is performed so that the sensor characteristic equation ($y=x$) of a normal pressure sensor may be obtained.

Hereinafter, referring to FIG. 6 and FIG. 7, a specific example of a hydrogen pressure sensor error correction method for a vehicle fuel cell system, according to an exemplary embodiment of the present invention, will be described.

FIG. 6 is a flowchart illustrating a method of correcting an error of a hydrogen pressure sensor for a vehicle fuel cell system, according to the exemplary embodiment of the present invention. FIG. 7 is a graph illustrating (a) timing of opening and closing of a hydrogen purge valve, (b) changes in valve opening ratio, and (c) changes in hydrogen pressure at the same valve opening ratio as in the case of the flowchart of FIG. 6.

In the example of FIG. 6 and FIG. 7, the opening ratio of the hydrogen pressure regulation valve is changed two times, and the pressure measurement by the hydrogen pressure sensor is performed a total of three times before and after the opening ratio of the hydrogen pressure regulation valve is changed.

Referring to FIG. 6, to correct the error of the hydrogen pressure sensor in a vehicle fuel cell system, in Step S601, it is first determined whether or not the opening ratio of the hydrogen pressure regulation valve is within a normal range on the basis of a data map showing a relationship between the pressure of an air electrode (i.e., stack current) and the opening ratio of the hydrogen pressure regulation valve.

That is, in Step S601, a controller is configured to determine whether the opening ratio of the hydrogen pressure regulation valve is in a normal range on the basis of the data map showing the relationship between at least one of a stack current, an air electrode pressure, and an air flow rate, and the opening ratio of the hydrogen pressure regulation valve.

The data map includes information related to an upper error margin and a lower error margin for the normal opening ratio of the hydrogen pressure regulation valve. Therefore, the controller is configured to determine whether the opening ratio of the hydrogen pressure regulation valve exceeds the upper error margin or falls short of the lower error margin. When it is determined that the opening ratio of the hydrogen pressure regulation valve is outside the upper error margin or the lower error margin, it is determined that the opening ratio of the hydrogen pressure regulation valve is in an abnormal range in Step S601.

Next, it is checked whether hydrogen purging is performed. The control is performed such that a series of error correction processes S603 to S606 are performed only in the case that hydrogen purging is determined as being performed.

That is, when it is determined that the opening ratio of the hydrogen pressure regulation valve 130 is not in a normal range in S601, the error correction is performed because the error of the hydrogen pressure sensor is highly likely to occur.

In this regard, in S602, when it is confirmed that the hydrogen purge valve is opened to perform the hydrogen purging, the opening ratio of the hydrogen pressure regulation valve is changed and the pressure value (measurement value) is detected by the hydrogen pressure sensor. That is, as illustrated in FIG. 7, the opening ratio change of the hydrogen pressure regulation valve and the hydrogen pressure detection are both conducted with the hydrogen purge valve being open. This is performed to equalize the pressure at the end portion of the hydrogen electrode and the atmospheric pressure.

On the other hand, in an exemplary embodiment of the present invention, the hydrogen pressure regulation valve is controlled to have three different valve opening ratios during the hydrogen purging period.

In other words, in Step S603 in FIG. 6, the valve opening ratio of the hydrogen pressure regulation valve corresponds to a stack current detected at an initial stage. That is, the valve opening ratio in the present step (i.e., S603) is indicated by a first time of change in a graph b of FIG. 7. When the valve opening ratio is changed a first time, the hydrogen pressure changes as illustrated in a graph c of FIG. 7. The hydrogen pressure detected at the present time is referred to as a first measurement value. In Step S603, the opening ratio of the hydrogen pressure regulation valve is the same as an initial valve opening ratio corresponding to the stack current measured at the time of initiating the hydrogen purging, or a valve opening ratio (hereinafter, referred to as a first valve opening ratio) changed one time from the initial valve opening ratio after the hydrogen purge valve is opened.

Next, in Step S604, the valve opening ratio is changed by L1 from the valve opening ratio used in Step S603. In the instant case, the change L1 in the valve opening ratio is an arbitrary value. The change L1 in the valve opening ratio may be a positive value or a negative value. The present opening ratio change in Step S604 is indicated by a second time of change in the graph b of FIG. 7 and is referred to as a second valve opening ratio. When the valve opening ratio is changed from the first valve opening ratio to the second valve opening ratio, the hydrogen pressure detected by the hydrogen pressure sensor also changes. The hydrogen pressure is indicated by a second time of change in the hydrogen pressure as in the graph c of FIG. 7. At the instant time, the measured hydrogen pressure is referred to as a second measurement value.

Next, the valve opening ratio of the hydrogen pressure regulation valve is changed a third time in Step S605.

That is, in Step S605, the valve opening ratio is changed by L2 to reach a third valve opening ratio that has a different value from the values of the first and second valve opening ratios. Here, the change L2 in the valve opening ratio is an arbitrary value. The change L2 in the valve opening ratio may be a positive value or a negative value. Step S605 corresponds to a portion indicated by a third time of change in the valve opening ratio in the graph c of FIG. 7. In the case of the third time of change in the valve opening ratio, the hydrogen pressure changes to a measurement value indicated by a third time of change in hydrogen pressure as in the graph c of FIG. 7. At the instant time, the measured hydrogen pressure is referred to as a third measurement value.

Through the first time of change, the second time of change, and the third time of change in the valve opening ratio, the valve opening ratio increases or decreases stepwise such that the values of the valve opening ratios are in order of from the first opening to the third opening. Alternatively, as illustrated in FIG. 7, the valve opening ratio may be changed such that it is first reduced to the second opening ratio and then increased to the third opening ratio. Conversely, the valve opening ratio may be changed such that it is first increased and then reduced.

In other words, according to the exemplary embodiment of the present invention, the direction of change in the valve opening ratio is not important, but it is important to ensure that the opening ratios of the hydrogen pressure regulation valve differ at the respective steps differ.

When the first through third measurement values are detected in Steps S603, S604, and S605, respectively, a pressure sensor offset and a gradient error are corrected are corrected on the basis of the measurement values in S606. That is, Step S606 is a step of correcting the error of the hydrogen pressure sensor. The detected first, second, and third measurement values are compared with normal pressure values at the respective valve opening ratios at which the first, second, and third measurement values are detected. The normal pressure values are pressure value pre-stored in advance in the controller. The normal pressure values are pressure values detected by a normal hydrogen pressure sensor in a normal state at different opening ratios of the hydrogen pressure regulation valve with the hydrogen purge valve being open. The specific error correction method is the same as that described above.

After the error correction phase is finished, it is checked whether the hydrogen purge valve is closed or whether the hydrogen purging is completed in Step S607. After the hydrogen purging is completed, the control process returns to Step S601 and the hydrogen pressure sensor error correction logic is repeated.

As described above, the hydrogen purge valve needs to remain open at all times during the error correction phase. That is, S603 through S605 preferably need to be completed before the hydrogen purge valve is closed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of correcting an error of a hydrogen pressure sensor of a vehicle fuel cell system, the method comprising:
   checking, by a controller, when an opening ratio of a hydrogen pressure regulation valve is in a predetermined range by use of a data map showing a relationship between at least one of a stack current, an air electrode pressure, and an air flow rate, and the opening ratio of the hydrogen pressure regulation valve;
   checking when a hydrogen purge valve is opened when the opening ratio of the hydrogen pressure valve is not within the predetermined range;
   changing the opening ratio of the hydrogen pressure regulation valve at least one time when the hydrogen purge valve is determined as being opened, and detecting two or more measurement values of the hydrogen pressure sensor at two or more different opening ratios of the hydrogen pressure regulation valve, respectively; and
   comparing, by the controller, the two or more measurement values of the hydrogen pressure sensor detected at the two more opening ratios, respectively with predetermined pressure values corresponding to the opening ratios, respectively, and correcting errors of the hydrogen pressure sensor between the two or more measurement values and the predetermined pressure values, respectively, such that the two or more measurement values follow the predetermined pressure values.

2. The method of according to claim 1,
   wherein the predetermined pressure values are values pre-stored in the controller and varying according to the opening ratios of the hydrogen pressure regulation valve in a normal state when the hydrogen purge valve is opened.

3. The method according to claim 1,
   wherein in the detecting of the two or more measurement values of the hydrogen pressure sensor, a first measurement value of the two more measurement values is detected at an initial opening ratio of the hydrogen pressure regulation valve when the hydrogen pressure regulation valve starts opening, a second measurement value of the two more measurement values is detected at a first opening ratio of the hydrogen pressure regulation valve when the opening ratio of the hydrogen pressure regulation valve is changed one time from the initial opening ratio when the opening ratio of the hydrogen pressure regulation valve is changed a total of two times from the initial opening ratio, and a third measurement value of the two more measurement values is detected at a second opening ratio when the opening ratio of the hydrogen pressure regulation valve is changed from the initial opening ratio two times.

4. The method according to claim 3,
   wherein in the correcting of the error of the hydrogen pressure sensor, the error of the hydrogen pressure sensor is corrected such that the first measurement value, the second measurement value, and the third measurement value follow predetermined measurement values corresponding to the initial opening ratio, the first opening ratio, and the third opening ratio of the hydrogen pressure regulation valve, respectively.

5. The method according to claim 4,
   wherein in the correcting of the error of the hydrogen pressure sensor, the error is corrected such that a pressure offset of the two or more measurement values and a gradient error of the hydrogen pressure sensor are determined, and the pressure offset and the gradient error are eliminated.

6. The method according to claim 1,
   wherein the data map includes information related to an upper error margin and a lower error margin with respect to a predetermined opening ratio of the hydrogen pressure regulation valve, and
   wherein the controller is configured to determine that the opening ratio of the hydrogen pressure regulation valve is not within the predetermined range when the opening ratio of the hydrogen pressure regulation valve is outside the upper error margin or the lower error margin.

7. The method of according to claim 1, wherein the detecting of the two or more measurement values of the hydrogen pressure sensor starts after the hydrogen purge valve opens and ends before the hydrogen purge valve closes.

8. A vehicle fuel cell system comprising:
   a hydrogen supply shut-off valve mounted on a hydrogen supply line connected to a hydrogen tank and a fuel cell stack and configured to allow or interrupt supply of a hydrogen gas contained in the hydrogen tank to the fuel cell stack;
   a hydrogen pressure regulation valve mounted on the hydrogen supply line downstream of the hydrogen supply shut-off valve and configured to reduce a pressure of the hydrogen gas passing through the hydrogen supply shut-off valve and supply the pressure-reduced hydrogen gas to the fuel cell stack;
   a hydrogen pressure sensor configured to measure the pressure of the hydrogen gas supplied to a hydrogen electrode of the fuel cell stack through the hydrogen supply line;
   a hydrogen purge valve mounted on an outlet side of the hydrogen electrode and configured to selectively perform hydrogen purging; and
   a controller connected to the hydrogen pressure sensor, the hydrogen supply shut-off valve and the hydrogen purge valve and configured to receive pressure information from the hydrogen pressure sensor and to control operation of the hydrogen supply shut-off valve and the hydrogen purge valve,
   wherein the controller is configured to pre-store a data map showing a relationship between at least one of a stack current, an air electrode pressure, and an air flow rate, and an opening ratio of the hydrogen pressure regulation valve, and predetermined pressure values according to opening ratios of the hydrogen pressure regulation valve, and wherein the controller is configured to change the opening ratio of the hydrogen pressure regulation valve at least one time when it is determined by the controller that opening of the hydrogen pressure regulation valve is not within a predetermined range on a basis of the data map when the hydrogen purge valve is opened, obtains two or more measurement values detected by the hydrogen pressure sensor at two or more opening ratios of the hydrogen pressure regulation valve, respectively, compares the two or more detected measurement values with normal pressure value detected by a normal hydrogen pressure sensor at the opening ratios at which the two or more measurement values are detected, respectively, and corrects an error of the hydrogen pressure sensor in real time, such that the two or more detected measurement values follow the normal pressure values.

9. The vehicle fuel cell system according to claim 8,
wherein the predetermined pressure values are values pre-stored in the controller and vary according to the opening ratios of the hydrogen pressure regulation valve in a normal state when the hydrogen purge valve is opened.

10. The vehicle fuel cell system according to claim 8,
wherein the controller is configured to obtain a first measurement value of the two or more measurement values detected by the hydrogen pressure sensor at an initial opening ratio of the hydrogen pressure regulation valve at initial timing at which the hydrogen pressure regulation valve starts opening, a second measurement value of the two or more measurement values detected by the hydrogen pressure sensor at a first opening ratio of the hydrogen pressure regulation valve when the opening ratio of the hydrogen pressure regulation valve is changed one time when the opening ratio is designed to be changed a total of two times from the initial opening ratio, and a third measurement value of the two or more measurement values detected by the hydrogen pressure sensor at a second opening ratio of the hydrogen pressure regulation valve when the opening ratio of the hydrogen pressure regulation valve is changed two times from the initial opening ratio.

11. The vehicle fuel cell system according to claim 10,
wherein the controller is configured to correct the error of the hydrogen pressure sensor such that the first measurement value, the second measurement value, and the third measurement value follow predetermined measurement values corresponding to the opening ratios at which the first measurement value, the second measurement value, and the third measurement value are detected, respectively.

12. The vehicle fuel cell system according to claim 11,
wherein the controller is configured to determine a pressure offset of the two or more measurement values and a gradient error of the hydrogen pressure sensor, and is configured to perform error correction such that the pressure offset and the gradient error are eliminated.

13. The vehicle fuel cell system according to claim 8,
wherein the data map includes information related to an upper error margin and a lower error margin with respect to a predetermined opening ratio of the hydrogen pressure regulation valve, and
wherein the controller is configured to determine when the opening ratio of the hydrogen pressure regulation valve is in the predetermined range when the opening ratio of the hydrogen pressure regulation valve is outside the upper error margin or the lower error margin.

14. The vehicle fuel cell system according to claim 8,
wherein the controller starts changing the opening ratio of the hydrogen pressure regulation valve and finishes obtaining the first, second, and third the measurement values of the two or more measurement values detected by the hydrogen pressure sensor at the opening ratios of the hydrogen pressure regulation valve.

\* \* \* \* \*